United States Patent
Honma

(10) Patent No.: US 7,273,209 B2
(45) Date of Patent: Sep. 25, 2007

(54) SUSPENSION APPARATUS

(75) Inventor: Motohiko Honma, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 101 days.

(21) Appl. No.: 11/204,105

(22) Filed: Aug. 16, 2005

(65) Prior Publication Data

US 2006/0054439 A1 Mar. 16, 2006

(30) Foreign Application Priority Data

Sep. 10, 2004 (JP) ............................. 2004-263537

(51) Int. Cl.
*F16F 9/22* (2006.01)
(52) U.S. Cl. .................. 267/64.25; 280/6.159
(58) Field of Classification Search ............ 267/64.25, 267/113, 217, 274, 275; 188/314; 280/6.159, 280/124.158, 124.159
See application file for complete search history.

(56) References Cited

U.S. PATENT DOCUMENTS

| 3,527,452 | A | | 9/1970 | Hausenblas et al. |
| 4,478,431 | A | * | 10/1984 | Muller et al. ............ 267/64.25 |
| 5,364,081 | A | * | 11/1994 | Hartl ...................... 267/64.25 |

FOREIGN PATENT DOCUMENTS

| JP | A 60-193708 | 10/1985 |
| JP | A 61-021814 | 1/1986 |
| JP | A 63-49512 | 3/1988 |
| JP | A 63-78806 | 4/1988 |
| JP | A 63-130419 | 6/1988 |

* cited by examiner

*Primary Examiner*—Melanie Torres
(74) *Attorney, Agent, or Firm*—Oliff & Berridge, PLC

(57) ABSTRACT

A suspension apparatus for use in a vehicle including a body, a body-side member, a wheel, and a wheel-side member, the apparatus including a hydraulic suspension device which is adapted to be provided between the body-side member and the wheel-side member; a first accumulator which is connected to the hydraulic suspension device via a liquid passage and which allows a hydraulic liquid to flow from the liquid passage into the first accumulator when a pressure of the hydraulic liquid in the liquid passage exceeds a first pre-set liquid pressure, the liquid passage including a first portion which is located between an intermediate point thereof and the hydraulic suspension device, and a second portion which is located between the intermediate point thereof and the first accumulator; and a second accumulator which is connected, via a connection passage shorter than the second portion of the liquid passage, to the intermediate point of the liquid passage and which allows the hydraulic liquid to flow from the liquid passage into the second accumulator when the pressure of the hydraulic liquid in the liquid passage exceeds a second pre-set liquid pressure higher than the first pre-set liquid pressure.

9 Claims, 2 Drawing Sheets

SUSPENSION APPARATUS

The present application is based on Japanese Patent Application No. 2004-263537 filed on Sep. 10, 2004, the contents of which are incorporated herein by reference.

BACKGROUND OF THE INVENTION

1. Field of the Invention

The present invention relates to a suspension apparatus including a hydraulic suspension device (e.g., a so-called "hydraulic suspension cylinder") and at least two accumulators which are connected to the suspension device.

2. Discussion of Related Art

Each of Patent Document 1 (Japanese Patent Application Publication No. 63-130419), Patent Document 2 (Japanese Patent Application Publication No. 63-78806), and Patent Document 3 (Japanese Patent Application Publication No. 63-49512) discloses a suspension apparatus including a hydraulic suspension cylinder provided for a wheel of a vehicle, two accumulators connected to the suspension cylinder, and a switchable valve provided between the two accumulators.

When, in the above suspension apparatus, the switchable valve is switched between a closed state thereof and an open state thereof, the number of the accumulator(s) that communicates or communicate with the suspension cylinder is changed, and accordingly a spring constant of the two accumulators as a whole is changed between a high value and a low value.

SUMMARY OF THE INVENTION

It is therefore an object of the present invention to provide a suspension apparatus which includes a hydraulic suspension device and two accumulators connected to the suspension device via a liquid passage, and which effectively prevents pulsation from occurring to the liquid passage.

Hereinafter, some examples of various modes of the present invention that are recognized as being claimable in the present application (hereinafter, referred to as the claimable modes, where appropriate) will be described and explained. The claimable modes include at least respective modes corresponding to the appended claims, but may additionally include broader or narrower modes of the present invention or even one or more different inventions than the present invention. Each of the following modes (1) through (10) is numbered like the appended claims, and depends from the other mode or modes, where appropriate, so as to help understand the claimable modes and to indicate and clarify possible combinations of elements or technical features thereof. It is, however, to be understood that the present invention is not limited to the elements or technical features of the following modes, or the combinations thereof, that will be described below for illustrative purposes only. It is to be further understood that each of the following modes should be construed in view of not only the explanations directly associated therewith and but also the detailed description of the preferred embodiments of the invention, and that in additional claimable modes, one or more elements or one or more technical features may be added to, or deleted from, any of the following specific modes.

(1) A suspension apparatus for use in a vehicle including a body, a body-side member, a wheel, and a wheel-side member, the apparatus comprising a hydraulic suspension device which is adapted to be provided between the body-side member and the wheel-side member; a first accumulator which is connected to the hydraulic suspension device via a liquid passage and which allows a hydraulic liquid to flow from the liquid passage into the first accumulator when a pressure of the hydraulic liquid in the liquid passage exceeds a first pre-set liquid pressure, the liquid passage including a first portion which is located between an intermediate point thereof and the hydraulic suspension device, and a second portion which is located between the intermediate point thereof and the first accumulator; and a second accumulator which is connected, via a connection passage shorter than the second portion of the liquid passage, to the intermediate point of the liquid passage and which allows the hydraulic liquid to flow from the liquid passage into the second accumulator when the pressure of the hydraulic liquid in the liquid passage exceeds a second pre-set liquid pressure higher than the first pre-set liquid pressure. The hydraulic suspension device may be a so-called "hydraulic suspension cylinder".

In the present suspension apparatus, at least two hydraulic accumulators including the first and second accumulators are connected, in parallel, to the hydraulic suspension device. When the pressure of the hydraulic liquid in the liquid passage exceeds the first pre-set liquid pressure, the hydraulic liquid flows into the first accumulator; and when the hydraulic pressure exceeds the second pre-set liquid pressure higher than the first pre-set liquid pressure, the hydraulic liquid flows into the second accumulator.

It is preferred that the second pre-set liquid pressure be higher than the first pre-set liquid pressure by an appropriate amount. For example, the second liquid pressure may be pre-set at such a value that may be regarded as being excessively high for the present suspension apparatus, or such a value that may prevent the hydraulic pressure from being excessively increased. In those cases, the second accumulator functions as a relief device. The present suspension apparatus may employ, e.g., two or three hydraulic accumulators that are connected, in parallel, to the hydraulic suspension device. In the case where the suspension apparatus employs three hydraulic accumulators, the present invention is applicable to two hydraulic accumulators out of the three hydraulic accumulators.

In a state in which the hydraulic pressure in the liquid passage (hereinafter, referred to as the "system pressure" where appropriate) is higher than the first pre-set liquid pressure and lower than the second pre-set liquid pressure, the hydraulic liquid flows between the hydraulic suspension device and the first accumulator, upon operation of the suspension device.

Meanwhile, when the system pressure exceeds the second pre-set pressure, the hydraulic liquid is supplied to the second accumulator as well. Thus, a spring constant of the first and second accumulators as a whole is lowered. Therefore, when a certain amount of the hydraulic liquid flows out of the suspension device (e.g., when a stroke of the suspension cylinder is changed by a certain amount), an amount of increase of the system pressure is effectively decreased and accordingly the system pressure can be prevented from being excessively increased.

On the other hand, when the system pressure lowers below the second pre-set pressure, the hydraulic liquid is inhibited from flowing into, and out of, the second accumulator. If the hydraulic liquid from the first accumulator flows toward the suspension device, at the intermediate point of the liquid passage where the connection passage is connected to the liquid passage, cavitation would occur to the connection passage and, because of changes of the hydraulic pressure at the intermediate point, pulsation would occur to the connection passage. The pulsation may produce abnormal noise or adversely influence the operation of the suspension device.

In contrast, in the suspension apparatus in accordance with the present invention, the first accumulator is connected to the suspension device via the liquid passage including the first portion located between the intermediate point thereof and the suspension device and the second portion located between the intermediate point and the first accumulator, and the second accumulator is connected, via the connection passage shorter than the second portion of the liquid passage, to the intermediate point of the liquid passage. Thus, the first accumulator is connected to the suspension device via the first and second portions of the liquid passage, and the second accumulator is connected to the suspension device via the connection portion and the first portion of the liquid passage. The first portion of the liquid passage is common to the first and second accumulators, the second portion of the liquid passage is exclusive to the first accumulator (hereinafter, referred to as the "first individual passage" where appropriate), and the connection passage is exclusive to the second accumulator (hereinafter, referred to as the "second individual passage" where appropriate). Since the second individual passage is shorter than the first individual passage according to the mode (1), pulsation can be more effectively prevented from occurring to the second individual passage, as compared with a case where the second individual passage is longer than the first individual passage. Thus, the production of abnormal noise can be restrained, and the adverse influence to the suspension device can be reduced.

The second individual passage may be shorter than the first individual passage such that a ratio, $L2/L1$, of a length, $L2$, of the second individual passage to a length, $L1$, of the first individual passage is not more than ½, not more than ⅓, not more than ⅕, or not more than ⅐ and, more preferably, not more than ¹⁄₁₀, not more than ¹⁄₂₀, not more than ¹⁄₃₀, or not more than ¹⁄₅₀.

(2) The suspension apparatus according to the mode (1), wherein each of the first and second accumulators accommodates an elastic body whose elastic deformation allows the hydraulic liquid to flow into said each of the first and second accumulators, and wherein the first accumulator has, as a first initial liquid pressure thereof, a lowest permission liquid pressure that permits the hydraulic liquid to flow thereinto, and the second accumulator has, as a second initial liquid pressure thereof, a lowest permission liquid pressure that permits the hydraulic liquid to flow thereinto and is higher than the first initial liquid pressure.

The elastic body may be provided by a mass of pressurized gas, such as a mass of high-pressure air; or a spring. The first initial liquid pressure may be equal to the first pre-set liquid pressure. The second initial liquid pressure may be equal to, or lower than, the second pre-set liquid pressure.

(3) The suspension apparatus according to the mode (1) or (2), wherein each of the first and second accumulators includes a housing; and a partition member which separates an inner space of the housing into two portions one of which provides a hydraulic chamber filled with the hydraulic liquid and an other of which accommodates an elastic body elastically pressing, via the partition member, the hydraulic liquid filling the hydraulic chamber.

The partition member may be provided by a flexible member such as bellows, a diaphragm, or a bladder; or a piston. In the case where the partition member is provided by a piston, the elastic body may be provide by a spring.

In the case where the elastic body is provided by a mass of pressurized gas, the above-indicated first or second initial liquid pressure of the first or second accumulator can be increased or decreased by increasing or decreasing pressure of the gas charged into the accumulator; and in the case where the elastic body is provided by a spring, the first or second initial liquid pressure of the first or second accumulator can be increased or decreased by increasing or decreasing a pre-set load of the spring.

(4) The suspension apparatus according to any of the modes (1) through (3), further comprising a switchable valve which is provided between the liquid passage and the second accumulator and which is switchable from a closed state thereof to an open state thereof when the pressure of the hydraulic liquid in the liquid passage exceeds the second pre-set liquid pressure.

The switchable valve may be a solenoid-operated valve or a relief valve as will be described below.

(5) The suspension apparatus according to the mode (4), wherein the switchable valve comprises a solenoid-operated valve which is switchable from a closed state thereof to an open state thereof when the pressure of the hydraulic liquid in the liquid passage exceeds the second pre-set liquid pressure.

(6) The suspension apparatus according to the mode (4), wherein the switchable valve comprises a relief valve which is switchable from a closed state thereof to an open state thereof when a pressure difference obtained by subtracting, from the pressure of the hydraulic liquid in the liquid passage, the pressure of the hydraulic liquid in the connection passage exceeds a reference pressure. The reference pressure may be a biasing pressure produced by a spring associated with the relief valve.

The solenoid-operated valve or the relief valve is provided between the second accumulator and the liquid passage, i.e., in the connection passage (i.e., the second individual passage). In the closed state of the solenoid-operated valve or the relief valve, the hydraulic liquid is inhibited from flowing into the second accumulator; and in the open state of the solenoid-operated valve or the relief valve, the hydraulic liquid is allowed to flow into the second accumulator. According to the mode (5) or (6), the second initial liquid pressure (i.e., the lowest permission liquid pressure) of the second accumulator may take any value so long as it is not higher than the second pre-set liquid pressure. For example, the second initial liquid pressure may be equal to, or lower than, the first initial liquid pressure of the first accumulator.

(7) The suspension apparatus according to any of the modes (1) through (6), wherein a length of the connection passage is not more than a pre-determined value.

The longer the connection passage is, the more effectively the pulsation can be restrained. The connection passage may be not more than 10 mm, not more than 20 mm, not more than 50 mm, not more than 100 mm, or not more than 200 mm.

(8) The suspension apparatus according to any of the modes (1) through (7), wherein each of the first and second accumulators includes a housing; and a partition member which separates an inner space of the housing into two chambers one of which is located on a side of a corresponding one of the liquid passage and the connection passage and provides a hydraulic chamber filled with the hydraulic liquid and an other of which is located opposite to the hydraulic chamber and provides a spring chamber elastically pressing, via the partition member, the hydraulic liquid filling the hydraulic chamber.

According to the mode (8), each of the first and second accumulators functions as a pressure-change absorbing device.

(9) A suspension apparatus for use in a vehicle including a body, a body-side member, a wheel, and a wheel-side member, the apparatus comprising a hydraulic suspension device which is adapted to be provided between the body-side member and the wheel-side member; and at least two accumulators comprising a first accumulator and a second accumulator which are connected, in parallel, to the hydraulic suspension device via a first liquid passage and a second liquid passage, respectively, which have different lengths.

The suspension apparatus in accordance with the mode (9) may employ any of the technical features in accordance with the modes (1) through (8).

(10) A suspension apparatus for use in a vehicle including a body, a body-side member, a wheel, and a wheel-side member, the apparatus comprising a hydraulic suspension device which is adapted to be provided between the body-side member and the wheel-side member; a first accumulator which is connected to the hydraulic suspension device via a liquid passage and which allows a hydraulic liquid to flow from the liquid passage into the first accumulator when a pressure of the hydraulic liquid in the liquid passage exceeds a first pre-set liquid pressure; and a second accumulator which is connected to an intermediate point of the liquid passage and which allows the hydraulic liquid to flow from the liquid passage into the second accumulator when the pressure of the hydraulic liquid in the liquid passage exceeds a second pre-set liquid pressure higher than the first pre-set liquid pressure.

The suspension apparatus in accordance with the mode (10) may employ any of the technical features in accordance with the modes (1) through (9). For example, the second accumulator may be provided at a position nearer to the hydraulic suspension device than a position where the first accumulator is provided, according to the mode (1).

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which.

DETAILED DESCRIPTION OF THE PREFERRED EMBODIMENTS

Hereinafter, there will be described a suspension apparatus as an embodiment of the present invention by reference to the drawings. Though four suspension apparatuses each according to the present invention are provided for four wheels (i.e., left and right front wheels and left and right rear wheels) of a vehicle, respectively, one of the four suspension apparatuses that is provided for, e.g., the left front wheel will be described as a representative of the four apparatuses, and description of the other, three apparatuses is omitted.

Figure 1:
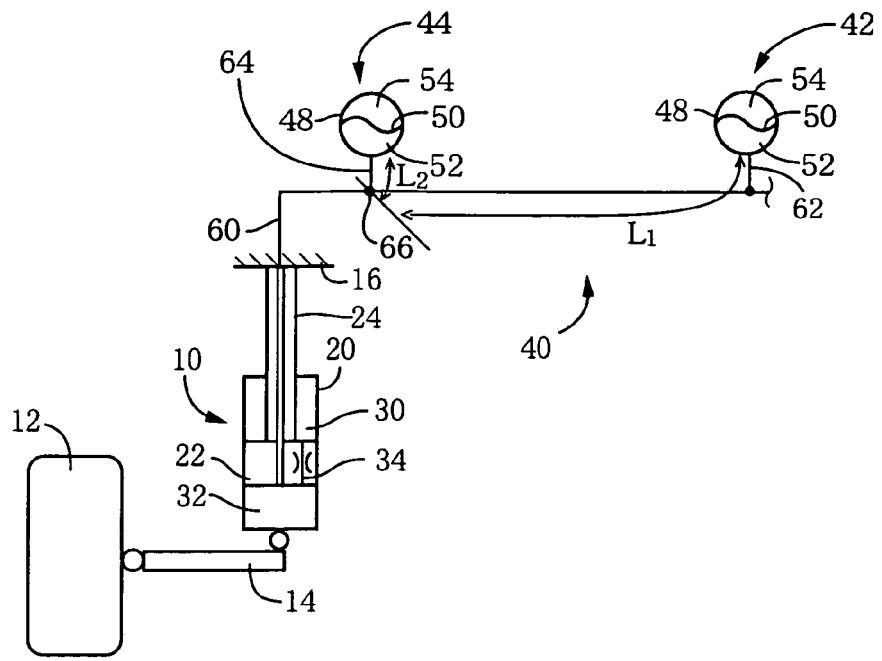
FIG. 1 is a schematic view of a relevant portion of a suspension apparatus as a first embodiment of the present invention.

In FIG. 1, reference numeral 10 designates a shock absorber as a sort of so-called "hydraulic suspension cylinder", i.e., a sort of hydraulic suspension device. The shock absorber 10 is provided, for a left front wheel 12 of an automotive vehicle, between a wheel-side member 14 located on the side of the wheel 12, and a body-side member 16 located on the side of a body of the vehicle. The shock absorber 10 includes a cylindrical housing 20, a piston 22 that is slideably received in an inner space of the housing 20, and a piston rod 24 that is fixed, at one end thereof, to the piston 24. In the present embodiment, the housing 20 is fixed to the wheel-side member 14 such that the housing 20 is not movable relative to the same 14 in an upward or a downward direction; and the piston rod 24 is fixed, at the other end thereof, to the body-side member 16 such that the piston rod 24 is not movable relative to the same 16 in the upward or downward direction.

In the shock absorber 10, the inner space of the housing 20 is separated by the piston 22 into two hydraulic chambers 30, 32, and the piston 22 has a communication passage 34 which has a restrictor and through which the two hydraulic chambers 30, 32 communicate with each other. When one of the wheel-side member 14 and the body-side member 16 is moved relative to the other in the upward or downward direction, the housing 20 and the piston 22 are moved relative to each other in the same direction. Thus, the shock absorber 10 exhibits a damping effect corresponding to a speed of movement of the piston 22 relative to the housing 20. A damping-characteristic control actuator, not shown, changes a cross-section area of the communication passage 34, and thereby controls a damping characteristic of the shock absorber 10.

One 32 of the two hydraulic chambers 30, 32 of the shock absorber 10 is connected, in parallel, to a first and a second accumulator 42, 44 via a flow passage 40.

Each of the first and second accumulators 42, 44 includes a housing 48, and a partition member 50 that separates an inner space of the housing 48 into two chambers, i.e., a hydraulic chamber 52 located on the side of the flow passage 40, and a gas chamber 54 located opposite to the hydraulic chamber 52. The hydraulic chamber 52 is filled with a hydraulic liquid, and the gas chamber 54 accommodates a mass of pressurized gas (e.g., high-pressure air) functioning as an elastic body. A pressure of the liquid in the hydraulic chamber 52 and a pressure of the gas in the gas chamber 54 are kept equal to each other. When the hydraulic liquid flows into the hydraulic chamber 52, a volume of the hydraulic chamber 52 is increased and accordingly a volume of the gas chamber 54 is decreased, so that the gas pressure in the gas chamber 54 is increased and accordingly the liquid pressure in the hydraulic chamber 52 is increased. The higher an initial pressure of the high-pressure gas filling the gas chamber 54 is, the higher the lowest permission liquid pressure at which the hydraulic liquid is permitted to flow into each accumulator 42, 44 is. Therefore, the lowest permission liquid pressure of each accumulator 42, 44 will be referred to as the initial liquid pressure thereof, where appropriate. In the present embodiment, the initial liquid pressure of the first accumulator 42 is equal to a first pre-set liquid pressure; and the initial liquid pressure of the second accumulator 44 is equal to a second pre-set liquid pressure higher than the first pre-set liquid pressure. In addition, each of the two accumulators 42, 44 is of a bladder type wherein the partition member 50 is provided by a bladder.

The flow passage 40 includes a common passage 60, and a first and a second individual passage 62, 64 that are connected to the first and second accumulators 42, 44, respectively. In other words, the shock absorber 10 and the first accumulator 42 are connected to each other by the common passage 60 and the first individual passage 62; and the shock absorber 10 and the second accumulator 44 are connected to each other by the common passage 60 and the second individual passage 64. Thus, the common passage 60 and the first individual passage 62 cooperate with each other to provide a liquid passage, and provide a first portion and a second portion of the liquid passage, respectively. In addition, a connection point 66 where the second individual passage 64 is connected to the common passage 60 provides an intermediate point of the liquid passage; and the second individual passage 64 provides a connection passage connected to the intermediate point of the liquid passage.

The second individual passage 64 is shorter than the first individual passage 62, and accordingly the second accumulator 44 is nearer to the shock absorber 10 than the first accumulator 42.

In the present embodiment, a length L2 of the second individual passage 64 is not more than 100 mm, and a ratio L2/L1 of the length L2 of the second individual passage 64 to a length L1 of the first individual passage 62 is equal to one twentieth (1/20).

Usually, when an external force is applied to the wheel-side member 14 or the body-side member 16 in the upward or downward direction, the liquid pressure in the hydraulic chamber 32 of the shock absorber 10 is changed, and the piston 22 is moved relative to the housing 20 in the upward or downward direction, so that the shock absorber 10 gives or receives some amount of the hydraulic liquid to or from the first accumulator 42. The initial liquid pressure of the second accumulator 44 is higher than that of the first accumulator 42, and normal changes of the liquid pressure in the hydraulic chamber 32 of the shock absorber 10 do not exceed the second pre-set liquid pressure as the initial liquid pressure of the second accumulator 44. Thus, the shock absorber 10 and the first accumulator 42 communicate some amount of the hydraulic liquid with each other.

Figure 2:
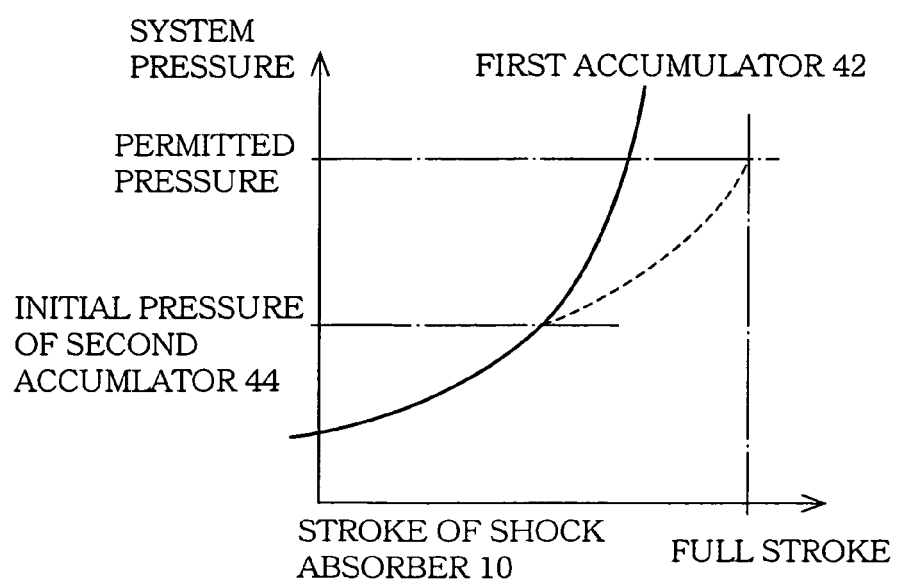
FIG. 2 is a graph representing a relationship between stroke of a shock absorber of the suspension apparatus and system pressure of the apparatus.

On the other hand, when a great force is applied to the wheel-side member 14 or the body-side member 16 in the upward or downward direction, for example, a large load is mounted on the vehicle, and accordingly the liquid pressure in the hydraulic chamber 32 of the shock absorber 10 exceeds the second pre-set liquid pressure of the second accumulator 44, the shock absorber 10 gives or receives some amount of the hydraulic liquid to or from the second accumulator 44 as well. Consequently a spring constant of the first and second accumulators 42, 44 as a whole is lowered as indicated at broken line in FIG. 2. Therefore, when a stroke of the piston rod 24 of the shock absorber 10 is changed by a certain amount, i.e., when a certain amount of the hydraulic liquid flows out of, or into, the hydraulic chamber 32 of the shock absorber 10, the amount of change of the liquid pressure in the flow passage 40 (i.e., a system liquid pressure) is decreased as compared with the above-indicated case where a small force is applied. Thus, the present suspension apparatus can prevent the system liquid pressure from being excessively increased over a permitted liquid pressure. That is, even if the shock absorber 10 may be operated by its full stroke, the system liquid pressure of the present suspension apparatus does not exceed the permitted liquid pressure. Thus, the present suspension apparatus can prevent an excessively great force from being applied to, e.g. a piping system thereof defining the flow passage 40 and thereby enjoy an improved durability. The second liquid pressure corresponding to the second accumulator 44 is pre-set based on the permitted liquid pressure of the suspension apparatus.

If the second individual passage 64 is longer than the first individual passage 62, then pulsation would occur to the second individual passage 64, so that abnormal noise might be generated and the operation of the shock absorber 10 might be adversely affected. More specifically explained, the present suspension system can take a low spring constant state in which the system liquid pressure is higher than the second pre-set liquid pressure, and a high spring constant state in which the system liquid pressure is lower than the second pre-set liquid pressure and the hydraulic liquid is inhibited from flowing into, or out of, the second accumulator 44. In the high spring constant state of the suspension apparatus, if the hydraulic liquid from the first accumulator 42 flows, at the connection point (i.e. the intermediate point) 66 where the second individual passage 64 is connected to the common passage 60, toward the shock absorber 10, cavitation may occur to the second individual passage 64, and pulsation may occur to the second individual passage 64 because of changes of the liquid pressure at the connection point 66.

In contrast, in the present embodiment, the second individual passage 64 is shorter than the first individual passage 62. Therefore, pulsation can be effectively prevented from occurring to the second individual passage 64, abnormal noise resulting from the pulsation can be reduced, and the influence of the noise to the shock absorber 10 can be reduced.

In the present embodiment, the second liquid pressure corresponding to the second accumulator 44 is pre-set based on the permitted liquid pressure of the suspension apparatus. However, the second liquid pressure of the second accumulator 44 may be pre-set in different manners, so long as the second pre-set liquid pressure is higher than the first pre-set liquid pressure corresponding to the first accumulator 42.

Figure 3:
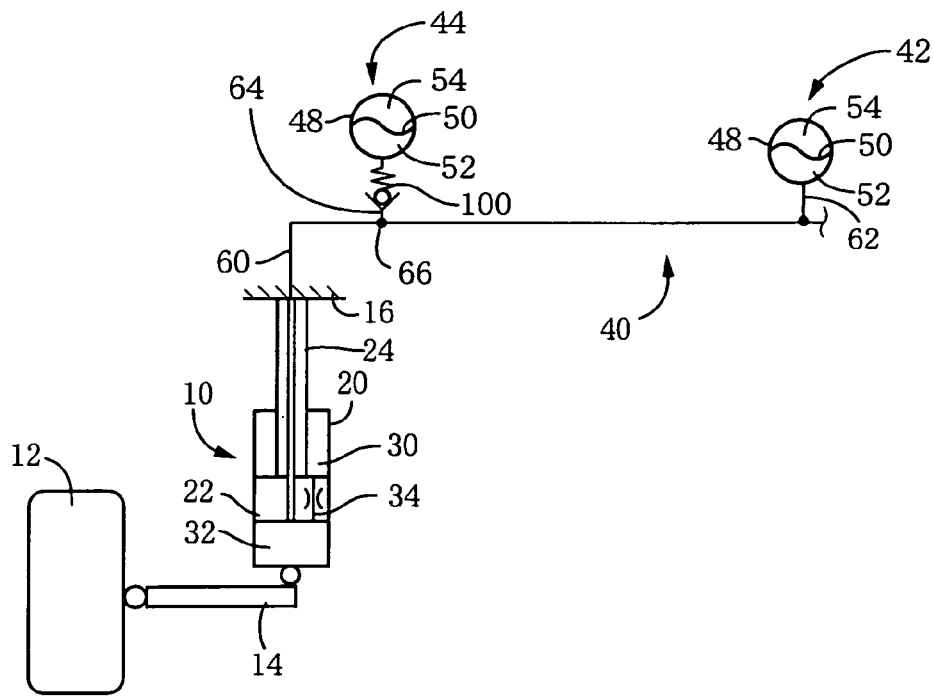
FIG. 3 is a schematic view corresponding to FIG. 1, showing a relevant portion of another suspension apparatus as a second embodiment of the present invention.

FIG. 3 shows a second embodiment of the present invention. The second embodiment differs from the above-described first embodiment shown in FIG. 1, in that the second embodiment additionally employs a relief valve 100 that is provided in the second individual passage 64 connected to the second accumulator 44. The relief valve 100 is switched from a closed state thereof in which the relief valve 100 does not allow the hydraulic liquid to flow into the second accumulator 44, and to an open state thereof in which the relief valve 100 allows the hydraulic liquid to flow into the second accumulator 44, when the system liquid pressure, i.e., the liquid pressure of the flow passage 40 exceeds the second pre-set liquid pressure corresponding to the second accumulator 44. Thus, when the liquid pressure of the flow passage 40 exceeds the second pre-set liquid pressure, the hydraulic liquid is allowed to flow into the second accumulator 44. Therefore, the second embodiment can enjoy the same advantages as those of the first embodiment.

In the second embodiment, the initial liquid pressure of the second accumulator 44 is lower than the second pre-set liquid pressure and, when a pressure difference obtained by subtracting, from the liquid pressure in the flow passage 40, the liquid pressure in the connection passage 64 exceeds a pressure applied by a spring to the relief valve 100, the relief valve 100 is opened to allow the hydraulic liquid to flow into the second accumulator 44. Thus, the second pre-set liquid pressure is equal to the initial liquid pressure of the second accumulator 44 plus the biasing pressure applied by the spring to the relief valve 100.

Figure 4:
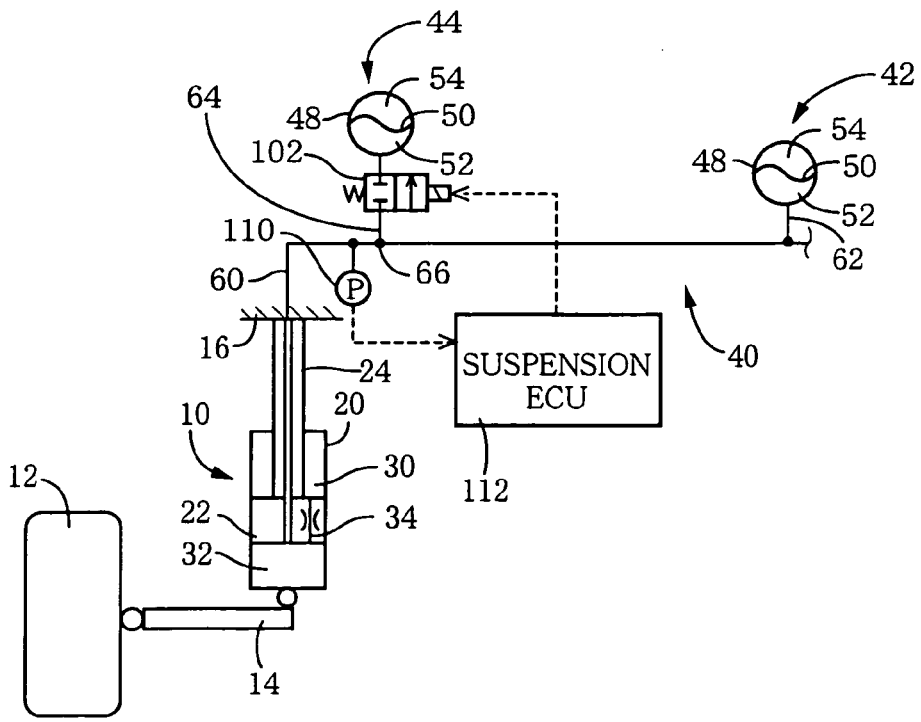
FIG. 4 is a schematic view corresponding to FIG. 1, showing a relevant portion of another suspension apparatus as a third embodiment of the present invention.

FIG. 4 shows a third embodiment of the present invention. The third embodiment differs from the above-described second embodiment shown in FIG. 2, in that the third embodiment employs, in place of the relief valve 100, a solenoid-operated open/close valve 102, and additionally employs a pressure sensor 110 that is provided in the flow passage 40 to detect the system liquid pressure, and a suspension ECU (electronic control unit) 112 that is essentially constituted by a computer and is connected to the solenoid of the open/close valve 102 and the pressure sensor 110. When the system liquid pressure detected by the pressure sensor 110 exceeds the second pre-set liquid pressure corresponding to the second accumulator 44, the suspension ECU 112 supplies an electric current to the solenoid of the open/close valve 102, so as to switch the valve 102 from a closed state thereof to an open state thereof. Consequently the hydraulic liquid is allowed to flow into the second accumulator 44 as well. Thus, the third embodiment can enjoy the same advantages as those of the first and second embodiments, e.g., can prevent the system liquid pressure from being excessively increased.

In each of the second and third embodiments in which the relief valve 100 or the solenoid-operated open/close valve 102 is employed, it is not essentially required to pre-set the initial liquid pressure of the second accumulator 44 to be higher than that of the first accumulator 42. That is, the initial liquid pressure of the second accumulator 44 may be equal to, or lower than, that of the first accumulator 42.

Each of the first and second accumulators 42, 44 is not limited to the above-described bladder type. For example, each accumulator 42, 44 may be of a bellows type, a diaphragm type, or a piston type. The two accumulators 42, 44 may be of different types from each other. In addition, each of the two accumulators 42, 44 may have an arbitrary spring constant.

In each of the above-described three embodiments, the shock absorber 10 functions as the hydraulic suspension device. However, for example, an elastic-force producing device that produces an elastic force corresponding to an amount of relative displacement of the wheel-side member 14 and the body-side member 16 in the upward or downward direction may be used as the hydraulic suspension device in accordance with the present invention.

It is to be understood that the present invention may be embodied with other changes and improvements, such as those described in SUMMARY OF THE INVENTION, that may occur to a person skilled in the art, without departing from the spirit and scope of the invention defined in the appended claims.

What is claimed is:

1. A suspension apparatus for use in a vehicle including a body, a body-side member, a wheel, and a wheel-side member, the apparatus comprising:
    a hydraulic suspension device which is adapted to be provided between the body-side member and the wheel-side member;
    a first accumulator which is connected to the hydraulic suspension device via a liquid passage and which allows a hydraulic liquid to flow from the liquid passage into the first accumulator when a pressure of the hydraulic liquid in the liquid passage exceeds a first pre-set liquid pressure, the liquid passage including a first portion which is located between an intermediate point thereof and the hydraulic suspension device, and a second portion which is located between the intermediate point thereof and the first accumulator; and
    a second accumulator which is connected, via a connection passage shorter than the second portion of the liquid passage, to the intermediate point of the liquid passage and which allows the hydraulic liquid to flow from the liquid passage into the second accumulator when the pressure of the hydraulic liquid in the liquid passage exceeds a second pre-set liquid pressure higher than the first pre-set liquid pressure.

2. The suspension apparatus according to claim 1, wherein each of the first and second accumulators accommodates an elastic body whose elastic deformation allows the hydraulic liquid to flow into said each of the first and second accumulators, and wherein the first accumulator has, as a first initial liquid pressure thereof, a lowest permission liquid pressure that permits the hydraulic liquid to flow thereinto, and the second accumulator has, as a second initial liquid pressure thereof, a lowest permission liquid pressure that permits the hydraulic liquid to flow thereinto and is higher than the first initial liquid pressure.

3. The suspension apparatus according to claim 1, wherein each of the first and second accumulators includes a housing; and a partition member which separates an inner space of the housing into two portions one of which provides a hydraulic chamber filled with the hydraulic liquid and an other of which accommodates an elastic body elastically pressing, via the partition member, the hydraulic liquid filling the hydraulic chamber.

4. The suspension apparatus according to claim 1, further comprising a switchable valve which is provided between the liquid passage and the second accumulator and which is switchable from a closed state thereof to an open state thereof when the pressure of the hydraulic liquid in the liquid passage exceeds the second pre-set liquid pressure.

5. The suspension apparatus according to claim 4, wherein the switchable valve comprises a solenoid-operated valve which is switchable from a closed state thereof to an open state thereof when the pressure of the hydraulic liquid in the liquid passage exceeds the second pre-set liquid pressure.

6. The suspension apparatus according to claim 4, wherein the switchable valve comprises a relief valve which is switchable from a closed state thereof to an open state thereof when a difference of the pressure of the hydraulic liquid in the liquid passage and the pressure of the hydraulic liquid in the connection passage exceeds a reference pressure.

7. The suspension apparatus according to claim 1, wherein a length of the connection passage is not more than a pre-determined value.

8. The suspension apparatus according to claim 1, wherein each of the first and second accumulators includes a housing; and a partition member which separates an inner space of the housing into two chambers one of which is located on a side of a corresponding one of the liquid passage and the connection passage and provides a hydraulic chamber filled with the hydraulic liquid and an other of which is located opposite to the hydraulic chamber and provides a spring chamber elastically pressing, via the partition member, the hydraulic liquid filling the hydraulic chamber.

9. The suspension apparatus according to claim 1, wherein the hydraulic suspension device includes a cylindrical housing which is adapted to be connected to one of the body-side member and the wheel-side member; a piston which separates an inner space of the housing into two hydraulic chambers each of which is filled with the hydraulic liquid and one of which communicates with the liquid passage, wherein the piston has a restrictor passage which connects between the two hydraulic chambers; and a piston rod which is connected, at one of opposite ends thereof, to the piston and is adapted to be connected, at an other of the opposite ends thereof, to an other of the body-side member and the wheel-side member.

* * * * *